Figure 1:
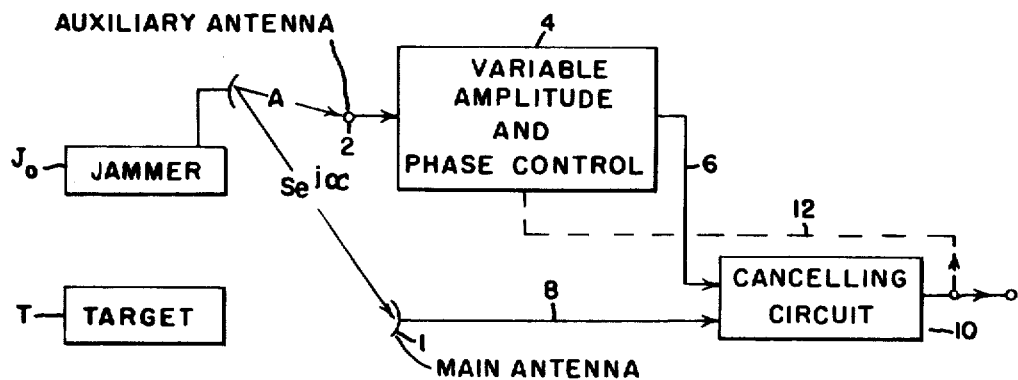

United States Patent [19]

Applebaum et al.

[11] 4,044,359
[45] Aug. 23, 1977

[54] MULTIPLE INTERMEDIATE FREQUENCY SIDE-LOBE CANCELLER

[75] Inventors: Sidney P. Applebaum, Liverpool; Paul W. Howells, Morrisville; James C. Kovarik, North Syracuse, all of N.Y.

[73] Assignee: General Electric Company, Syracuse, N.Y.

[21] Appl. No.: 165,259

[22] Filed: Jan. 9, 1962

[51] Int. Cl.² .......................... H04B 1/10; G01S 3/06
[52] U.S. Cl. ............................. 343/100 LE; 325/476; 343/18 E; 343/100 CL
[58] Field of Search .................. 343/100.7, 18, 5, 100, 343/100.12, 18 E; 325/473–477, 301–307, 365–367, 371

Primary Examiner—Maynard R. Wilbur
Assistant Examiner—Richard E. Berger

Attorney, Agent, or Firm—Carl W. Baker; Richard V. Lang; Frank L. Neuhauser

EXEMPLARY CLAIM

1. In an undesired signal canceller, a main signal transmission channel having an output terminal, a plurality of auxiliary signal transmission channels having output terminals, means for cross coupling each of said auxiliary channels separately to said main signal transmission channel, means for generating error signals representing the relative amplitude and phase of each undesired signal in the auxiliary channels cross-coupled with undesired signals in the main channel, compensating cross feed networks capable of adjustment for minimizing cross coupling at said main channel output terminal, and means responsive to said error signals for adjusting said cross feed networks in order to minimize cross coupling.

8 Claims, 5 Drawing Figures

INVENTORS:
SIDNEY P. APPLEBAUM,
PAUL W. HOWELLS,
JAMES C. KOVARIK,
BY Delbert P. Warner
THEIR ATTORNEY.

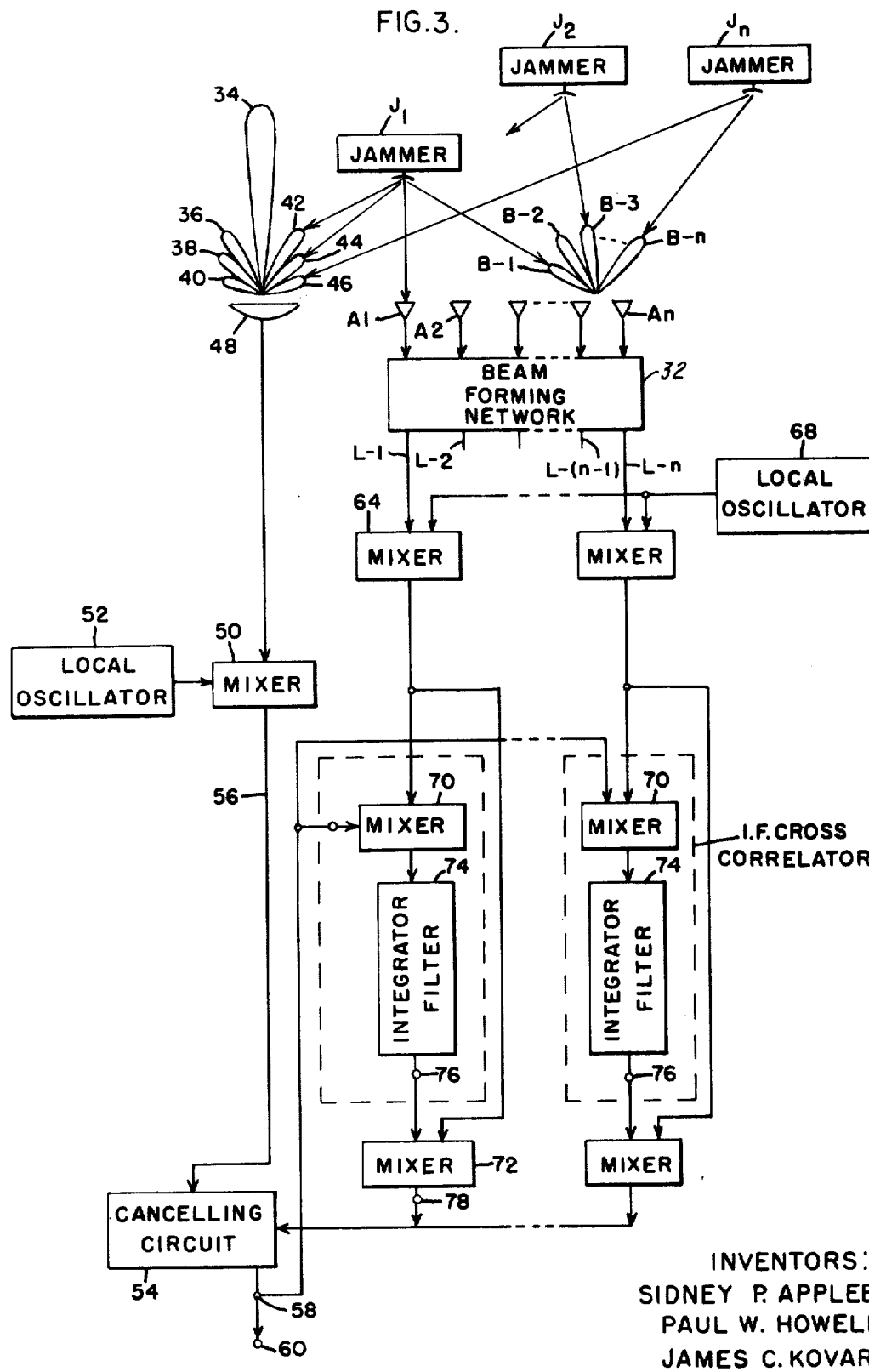

MULTIPLE INTERMEDIATE FREQUENCY SIDE-LOBE CANCELLER

This invention relates to the elimination of jamming in a signal processing system and in particular to the provision in such a system of a side-lobe canceller having the capability of simultaneously cancelling jammer signals received by one or a plurality of side-lobes of an antenna.

The prior art IF or intermediate frequency side-lobe cancellers have been limited to single side-lobe cancelling or to multiple side-lobe cancelling where they have employed time-sharing techniques or have used off-set frequencies in order to keep the signals separated in individual cancellers. In the case of the single side-lobe canceller, the obvious disadvantage is that only the effects of one jammer may be cancelled at a time and jamming noise from other jammers will be unaffected. The time sharing approach is limited to a very few jammer signals and produces transients that are hard to manage. The troubles with the off-set frequency technique are compounded by requirements for large amounts of additional equipment, such as separate local oscillators for each channel, and by spurious responses.

Examples of a single IF side-lobe canceller and of a multiple IF side-lobe canceller employing separate off-set frequencies are disclosed in the copending patent application of Paul W. Howells entitled "Intermediate Frequency Side-Lobe Canceller," patent application Ser. No. 810,961, filed on May 4, 1959, now U.S. Pat. No. 3,202,990, and assigned to the same assignee as the present invention.

It is a primary object, therefore, of this invention to provide improved means for cancelling jammer noise introduced into a radar system through the side-lobes of the principle antenna.

It is a further object of this invention to provide a multiple side-lobe canceller to operate at intermediate frequencies with existing intermediate frequency radar signal processing equipment.

It is another object of this invention to provide a side-lobe canceller which can be modified to cancel a number of jammer signals.

It is yet another object of this invention to make use of both phase and amplitude information in cancelling multiple jammer signals.

Briefly stated, in accordance with one aspect of the invention, an array of omni-directional receiving antennas is located at selected distances from a single direction or main receiving antenna. The omni-directional antennas are selected to be sensitive to jammer signals from many directions and are coupled individually to auxiliary channels in which the signals received are mixed with a signal from a local oscillator to provide auxiliary IF signals. The auxiliary IF signals are then cross-correlated in separate channels with the output signal of the whole system, which is supplied by a feedback loop from the output terminal, to provide error signals whose amplitudes reflect the relative power of the jammer signals and whose phase relationships equal the phase differences between the jammer signals in the main and auxiliary channels. These error signals are then heterodyned with the IF signals from the auxiliary channels back to the frequencies present in the main channel to produce a plurality of new error signals which are transmitted to a cancelling circuit. The directional or main antenna in the meantime has received a desired signal in its main lobe and the jammer signals in its side-lobes, all of which are mixed with a signal from a local oscillator to produce main IF signals and IF jammer signals. The main IF signals and IF jammer signals are then transmitted to the cancelling circuit where they are mixed with the new error signals to provide output signals for the system from which the jammer signals have been removed.

Figure 2:
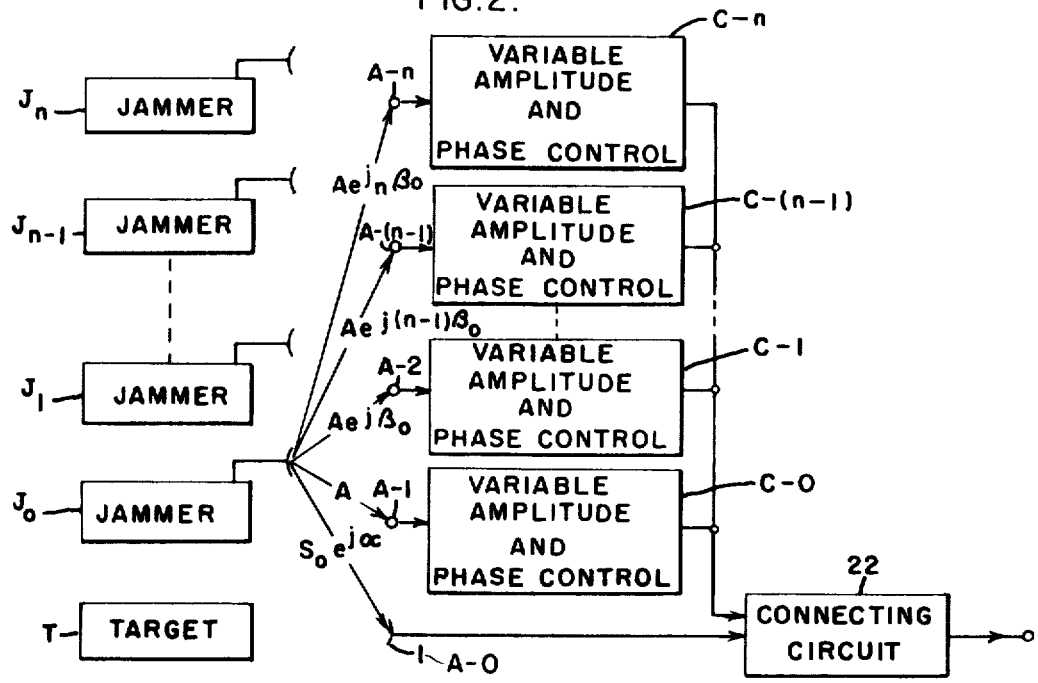
Figure 5:
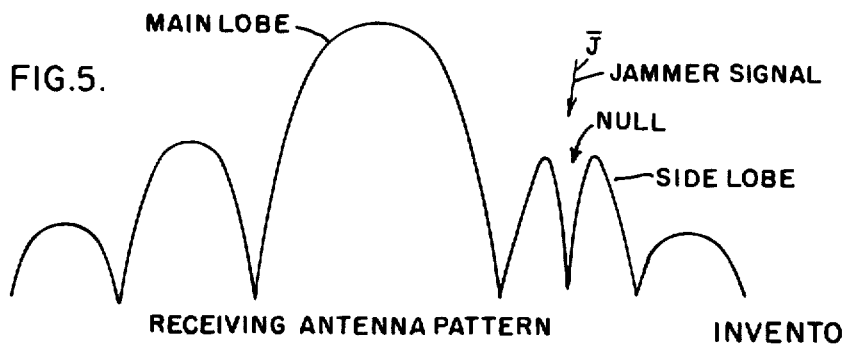
Figure 4:
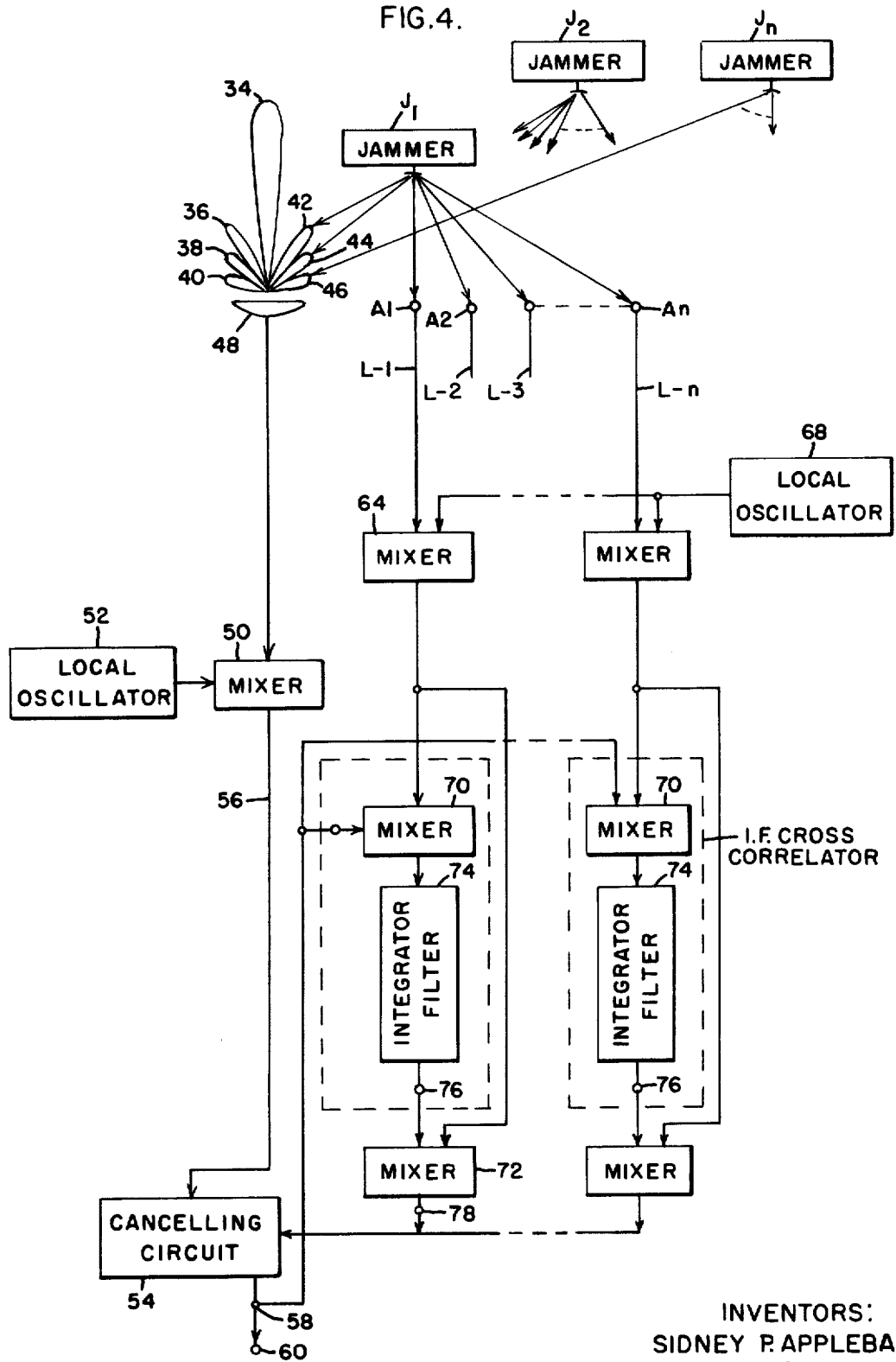

The features of this invention which are believed to be novel are set forth with particularity in the appended claims. The invention itself, however, both as to its organization and its method of operation, together with further objects and advantages thereof, may best be understood by reference to the following description taken in connection with the accompanying drawings, in which:

FIG. 1 is a block diagram of a simple IF side-lobe canceller circuit of use in explaining the operation of the invention, FIG. 2 is a block diagram of a multiple IF side-lobe canceller, FIG. 3 is a block diagram of a multiple IF side-lobe canceller illustrating an embodiment of the invention, FIG. 4 is a block diagram of a multiple IF side-lobe canceller illustrating a further embodiment of the invention, and FIG. 5 is a diagram of a typical receiver antenna pattern showing the way in which a null may affect the pattern.

Turning now to FIG. 1, which may be used in explaining the operation of the invention, we find a block diagram representing a simple canceller. This block diagram comprises a conventional main antenna 1, an auxiliary antenna 2, which is omni-directional in character, a cancellation path including a variable amplitude and phase control circuit 4, and connectors 6 and 8 for connecting the inputs from the main antenna and the auxiliary antenna to a cancelling circuit 10. In effect, we have two channels which comprise a flexible antenna system, control 4 of which may be adjusted to position a null at any desired point in the side-lobe structure of the main antenna. Since only enough of the omni pattern is added to cancel the side-lobe response of the main antenna, the effect on the main-lobe response, and therefore on the desired target signals, is negligible. An example of the effect of a null on a side lobe of an antenna pattern may be seen in FIG. 5, where the null is opposed to the jammer beam indicated by the vector $\bar{J}$.

Cancellation is achieved, in FIG. 1, in the following way. The auxiliary antenna is separated from the main antenna by a distance which is large compared to a wavelength, but small compared to the radar pulse length, so that the filtered jamming signals in the two channels are identical waveforms with negligible envelope delay difference. They may, however, have a constant phase and amplitude difference dependent on jammer azimuth direction and main antenna boresight position. This amplitude and phase difference is corrected in the cancellation path by adjustment of control 4, before the two paths are combined in cancelling circuit 10 to cancel the jamming. Thus, in FIG. 1, when the jammer signal from $J_o$ is received in the auxiliary antenna with amplitude A, and in the main channel with amplitude S and relative phase $\alpha$, the correct adjustment of the cancellation control would be:

(1)

-continued $$K = \frac{S}{A} / \alpha = \frac{S}{A} e^{j\alpha}$$

This adjustment may be made by hand in the simple case shown, but it will be made automatically and continuously in response to error signals from the cancelling circuit in the operating single IF side-lobe canceller. Provision for such automatic feedback is indicated by the dashed line 12 between the output of the cancelling circuit 10 and the control circuit 4.

A limitation of this simple canceller is that it can, in general, cancel only one jamming signal at a time. To cancel more than one jamming signal, a more flexible antenna system having additional auxiliary antennas and including provisions for additional adjustments is needed. With such a system, as many nulls as there are auxiliary elements may be independently positioned in the side-lobe structure of the main antenna.

Such a system is illustrated by the block diagram in FIG. 2, where it is indicated that $(n + 1)$ identical auxiliary elements are positioned to form a simple array. It will be assumed for the purpose of this simple model that the element spacing is even, however, in an actual canceller this would be undesireable, because of the echelon lobes present in an evenly-spaced array with many wavelengths between elements. Assume now that jammer signal from jammer $J_o$ is received at all of the auxiliary antennas A-0, A-1, . . . A-n with amplitude A, but due to the locations of the antennas, the jamming signals phase at the antenna A-1 is delayed $\beta_0$ radians compared to its phase at antenna A-0, at antenna A-2 its phase is $2\beta_0$, and so on. In the main antenna, the jammer amplitude and phase are respectively $S_0$ and $\alpha_0$. To cancel this jamming signal in the canceller 22, the ($n = 1$) controls C-0, C-1 . . . C-n should be adjusted so that the sum of the omni signals equals the jamming signal in the main path or $$k_o A + k_1 A e^{j\beta_0} + k_2 A e^{j2\beta_0} + \ldots + k_n A e^{jn\beta_0} = S_0 e^{j\alpha_0} \quad (2)$$

This may be abbreivated as:

$$A \sum_{m=0}^{n} k_m e^{jm\beta_0} = S_0 e^{j\alpha_0} \quad (3)$$

Now, if $n$ other jammers ($J_1 \ldots Jn$-1, $Jn$) are assumed, then $n$ similar equations could be written describing the required adjustments to cancel each. There are then $(n+1)$ unknowns (the $k$'s). If the equations are independent, a solution may be found, which would be an adjustment of the controls that results in simultaneous cancellation of all the jammers. The $(n + 1)$ auxiliary patterns have been added to the main antenna pattern to synthesize a combined pattern having nulls at all the jammer locations. Again, the main-lobe response of the main antenna is not seriously affected.

To achieve cancellation of $n$ jammers then, a multiple side-lobe canceller must solve this set of simultaneous equations, determine the $n$ values of $k$ required for cancellation, and adjust the gains and phases of the $n$ cancellation paths accordingly. In one embodiment of the invention, the multiple canceller consists of a family of single side-lobe canceller loops operating in parallel. To ensure their convergence to the desired solution, each loop was made independent of the others by feeding it from a directive auxiliary antenna covering a narrow sector in which only one jammer might be expected.

With each loop protecting a different angular sector, the multiple system becomes a collection of independent single side-lobe cancellers. A variation of this approach is illustrated in FIG. 3, where in order to avoid the expense of a family of separate auxiliary antennas of the required directivity, the family of $n$ auxiliary beams is generated by beam forming an array of $n$ omni-directional elements, A-1, A-2 . . . A-n. As illustrated at B-1, B-2 . . . B-n, a "fly's-eye" set of beams may be formed, one feeding each of the independent single canceller loops.

As indicated in FIG. 3, a beam forming network 32 may be employed to generate a fly's-eye type pattern from the auxiliary antennas. The beam forming network may be one of the kind shown by J. Butler and R. Lowe in "Beam Forming Matrix Simplifies Design of Electronically Scanned Antennas"; Electronics Design, Apr. 12, 1961; pp 170–173; or by Harold Shnitkin in "Survey of Electrically Scanned Antennas;" Microwave Journal; Vol. 3, No. 12 December 1960; pp 67–72. The output signals of the beam forming network 32, on lines L-1, L-2 . . . L-n, will have associated with each of them a signal representing the antenna pattern of one of the multiple beams B-1 through B-n indicated in FIG. 3. Therefore a signal from a jammer $J_1$, which is positioned so as to be in the pattern of beam B-1, would be resolved as a signal in an output channel connected to line L-1 of the beam forming network. Likewise, a signal from a jammer $J_n$, which is in beam B-n, would be resolved as a signal in an output channel connected to line L-n of the beam forming network. These output signals are then weighted in amplitude and phase by a loop containing a cross correlator and other processing equipment to provide a signal which can be used to provide cancellation of the jammer waveform from the main channel. The jammer wave from jammer $J_1$, which appears in line L-1, would have its amplitude and phase corrected to correspond to the amplitude and phase of the jammer $J_1$ signal in the main channel and would then be subtracted from the main channel. Each beam generated by the beam forming network would be processed in an identical manner, by identical cancellation loops, to obtain the multiple side-lobe cancellation capability.

The multiple IF side-lobe canceller in a preferred embodiment of the invention (FIG. 4) dispenses with the beam forming network 32 of FIG. 3 between the antennas A-1, A-2 . . . A-n and the transmission lines L-1, L-2 . . . L-n. The resulting system has been shown by test to be equivalent to the system indicated in FIG. 3 which does employ such a network. Since both analysis and test have thus far indicated that the cancelled outputs of these two systems are identical, the natural choice is the system which does not go to the added expense of formally performing beam forming from the auxiliary antenna array. The system without the beam forming unit actually has its beam forming controlled by the canceller loops which are in turn controlled by the IF cross correlators in such a manner that nulls are positioned in the side-lobe structure of the overall antenna patterns in the direction of the jammers. Attention is again directed to FIG. 5 for an indication of how the null operates to affect a side-lobe antenna pattern.

Turning to FIG. 3 and to FIG. 4 for a more detailed analysis of the operation of the invention, we find a plurality of fan shaped loops in the upper left-hand corner of each figure which are labeled 34, 36, 38 40, 42,

44 & 46. The lobe 34 is much the largest of the 7 loops illustrated and is intended to show the principle lobe of an antenna receiver pattern while the small fan shaped lobes 36, 38, 40, 42, 44 & 46 indicate side-lobes. As is well known in antenna theory, the side-lobes of an antenna pattern are caused by interference effects and are both much smaller than the principle lobe and practically impossible to eliminate. Where interference such as that from jammers is encountered in the principle lobe 34 certain steps may be taken to overcome it which are outside the scope of the present discussion, since the present invention is concerned primarily with what happens when the side-lobes receive jammer signal and how to cancel jammer signals received by the side-lobes. As indicated in FIG. 3 and FIG. 4, a number of jammer signals might be received such as those indicated by arrows directed from the jammer $J_n$ toward the side lobe 46. These jammer signals, together with any signals representing reflections from targets received in the lobe 34, will be transmitted by the antenna 48 to the principal or main channel of the system. The main channel includes a mixer at 50, a local oscillator at 52, and a subtracting circuit 54 which are coupled together by a line represented at 56. The main loop will connect to a terminal 58 and to an output terminal 60 from the cancelling or subtracting circuit 54.

In FIG. 3 there are $n$ cancelling channels which are independent of each other. The number $n$ refers to enough channels to allow for cancellation of the probable number of jammer signals which will be encountered, keeping in mind the problems of cost and the difficulty of handling excessively large amounts of equipment. A number of jammers are illustrated in connection with FIG. 3, namely jammers $J_1$ through $J_n$, three of which are shown as providing jammer signals to lobes B-1, B-3 and B-$n$. The lobes B-1 through B-$n$ represent the beams formed by the network 32 and each of them is intended to show a lobe associated with one or the other of the antennas A-1 through A-$n$. For example, the jammer signal from $J_1$ which is shown as being transmitted to lobe B-1, will be transmitted by the antenna A-1 through the beam forming network 32 and line L-1 to a mixer 64 where it will be mixed with signal from the local oscillator 68 to form an intermediate frequency or IF signal which will then be transmitted to the mixers 70 and 72. The signal appearing at terminal 58, which corresponds to the output appearing at 60 will also be supplied at mixer 70. The product of the two signals supplied at 70 will then be integrated by the integrating filter 74 and be applied to the mixer 72.

It will be understood that the effect of multiplying the two signals in the mixer 70 and then integrating them in the integrating filter 74 is to perform a cross correlation. The result of this cross correlation is an output signal at 76 having very special properties, namely an error signal having an amplitude representative of the relative power of the jammer signals in the main and auxiliary channels and also having phase relationship equal to the phase differences between the jammer signals in the main and auxiliary channels. The error signal at 76 is then supplied to mixer 72 where it is heterodyned with the IF signals from the mixer 64 back to the frequencies and phase present in the main channel, so that new error signals are supplied at terminal 78. These new error signals, when mixed with the signal received from the main antenna in the cancelling circuit 54, will cancel the jammer signals so that only the signal representing target signals received in the main lobe 34 will be available at terminals 58 and 60.

It will be appreciated that each auxiliary channel, of which there are $n$ in FIG. 3, could be operated separately to cancel the jammer received in its corresponding lobe as determined by the beam forming network 32. It is not evident from the foregoing however that it would be possible to eliminate the beam forming network 32 as illustrated in FIG. 4 with the expectation that the loops would correct the jamming signals received so as to effect cancellation at point 58. On the contrary, in the system in FIG. 4 it would be expected that since no formal attempt was made to separate the jammers into individual channels that it would never function. The system illustrated in FIG. 3 was conceived by the inventors to offer a solution to the problem of simultaneous parallel operation of the auxiliary circuits, since each of the associated auxiliary antennas would be beamed in a separate direction and consequently each beam would receive signals from one jammer only and from no other jammers and under the circumstances it might be expected that the cancelling circuit would operate effectively to remove the separate signals which would result. The circuit of FIG. 3 was first tried by simulation on an analog computer after a theoretical study had indicated that such a system should work. It functions satisfactorily on the simulator and also works in a model employing two cycle cancellers and has subsequently been tested out on a larger scale.

Further study has led to the realization that the beam forming network 32 and the beams B-1 through B-$n$ are really unnecessary, since the system will work well in the form shown in FIG. 4, where the antennas of the auxiliary channels are allowed to receive jamming signal from all directions as indicated by the arrows at the top of the figure. It is apparent from inspection of FIG. 4 that the elements corresponding to those in FIG. 3 are numbered the same way. The model of operation of the embodiment in FIG. 4 is also nearly identical to that of the embodiment in FIG. 3 except, of course, that the beam forming network 32 has been eliminated in FIG. 4 along with the representation of the beams B-1 through B-$n$. An important difference, of course, is that in FIG. 4 no attempt is made to limit each jammer signal to a separate one of the antennas L-1 through L-$n$. In actual tests each jammer signal has been cancelled up to $n$ jammers. The cancellation is automatically made by action of the individual cross correlators in each of the auxiliary channels on separate jammer signals.

In order to better explain the operation of the present invention the following comments in question and answer form are presented.

The first question might be: "Why does not the cross correlator correct its output in phase and amplitude sufficiently to cancel the desired main lobe signal?" This question can be answered in at least two ways. First, the signal of interest or main lobe signal 34 is received by an antenna which is designed to produce a high gain for signals occurring in its main lobe and to de-emphasize the signals appearing in its side lobes (or the side lobe signals). The auxiliary antennas are low gain antennas which can only produce signals of small amplitude, whether they are the signal of interest (34) or side lobe signals. As a consequence, when the signals from the auxiliary channels are applied in the cancelling circuit they can never be of sufficient amplitude to materially reduce the amplitude of the signal of interest.

A second answer to this question may be based on consideration of the power relationships of the desired signals and the jammer signals. The desired signals are pulses of high peak power, but of very low average power. The jammer signals, in order to jam at all ranges, must be continuous signals which have low peak power but high average power. Consequently, the systems used for cancelling jammer signals in this invention are preferably made to have a response time requiring high average power before they can generate cancelling signals. Having low average power, the desired signals cannot cause the systems to generate cancelling signals. Only the undesired signals are cancelled.

Another question can be expressed as follows: "How is it that each cross correlator can correctly adjust the signal in its own channel to the necessary phase and amplitude when the input to the cross correlator from point "50" comprises the output error due to all the $n$ cross correlator correction signals?" The answer to this lies in a consideration of the nature of the loops which include the cross correlators. Each of these loops includes a feedback circuit from a point 58 to a mixer 70 where the residue signal from point 58 is mixed with the signals from the mixer 64. The resulting mixed signal in mixer 70 is integrated in filter 74 to provide a signal at 76. The signal at 76 is then mixed with the signal from mixer 64 to provide a correcting signal of a phase and amplitude tending to reduce the signals at terminal 58 toward zero. If there is only one such correcting loop having one cross correlator and more than one jammer signal is present only a partial correction of the signal at 58 is possible, since the one cross correlator cannot completely compensate for phase and amplitude difference in two or more signals. Two correcting loops will tend to aid each other as each will tend to reduce the undesired residue signal at 58 and if there are as many correcting loops as spurious signals good cancellation is possible. That the correcting loops all act as servos is a key concept to understanding this aspect of the invention. As servos, each additional correcting loop will add to the total correction possible, since the corrections applied by each one affect what the others can do.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

What we claim as new and desire to secure by Letters Patent of the United States is:

1. In an undesired canceller, a main signal transmission channel having an output terminal, a plurality of auxiliary signal transmission channels having output terminals, means for cross coupling each of said auxiliary channels separately to said main signal transmission channel, means for generating error signals representing the relative amplitude and phase of each undersired signal in the auxiliary channels cross-coupled with undesired signals in the main channel, compensating cross feed networks capable of adjustment for minimizing cross coupling at said main channel output terminal, and means responsive to said error signals for adjusting said cross feed networks in order to minimize cross coupling.

2. In an intermediate frequency multiple sidelobe canceller, a main signal transmission channel having a directional antenna adapted to receive desired signals, a plurality of auxiliary signal transmission channels having omni-directional antennas adapted to receive primarily undesired signals, means coupling said directional antenna thru a conventional mixer to produce an intermediate frequency signal and thru a signal combining circuit to an output terminal, means coupling said omni-directional antennas thru conventional mixers to produce intermediate frequency signals and to one input of each of a plurality of band pass cross correlators, means coupling said output terminal to another input of each of said cross correlators, said cross correlators having output signals representative of the amplitude and phase difference of the components of said undesired signal in each of said channels, means for heterodyning said cross correlator output signals with said intermediate frequency signals of said auxiliary channels to produce auxiliary channel outputs at the same frequency as the intermediate frequency in said main channel and with any phase differences removed, and means coupling said auxiliary channel outputs to said combining circuit in order to subtract them from the signal in said main channel.

3. In combination, a main signal transmission channel having an output terminal and an input terminal adapted to receive a desired signal and a plurality of undesired signals, a plurality of auxiliary signal transmission channels adapted primarily to receive said undesired signals, a plurality of means for combining each of the auxiliary channel undesired signals with said first channel signals to provide a plurality of first signals, a plurality of means for mixing each of the undersired auxiliary channel signals with a related one of said first signals to provide a plurality of second signals, means for substantially modifying the undesired signals available at said output terminal comprising means responsive to the amplitudes and phases of said second signals for controlling the amplitude and phase of each of said undesired signals.

4. In combination, a main signal transmission channel capable of receiving a desired signal and a plurality of undesired signals and having an output terminal, a plurality of auxiliary signal transmission channels adapted primarily to receive said undesired signals, correlating means for comparing the portions of said undesired signals present in said main and auxiliary channels to determine their phase and amplitude relationship, means for mixing the output of said correlating means with said undesired signals in said individual auxiliary channels to provide compensating signals, means for subtracting said compensating signals from the signals present in said main channel for minimizing the amount of said undesired signals at said output terminal.

5. In an intermediate frequency sidelobe canceller, a main signal transmission channel having a directional antenna adapted to receive desired signals, a plurality of auxiliary signal transmission channels having a plurality of omni-directional antennas arranged in a linear array and adapted to receive primarily undesired signals, means coupling said directional antenna in series thru a mixer to produce a first intermediate frequency signal and thru a signal combining circuit to an output terminal, means coupling each of said omni-directional antennas thru a separate mixer to produce an intermediate frequency signal, means connecting each of the outputs of the separate mixers associated with said omni-directional antennas to one input of one of a plurality of cross correlators, means coupling said output terminal to another input of each of said cross correlators, said cross correlators generating output signals representative of the amplitude and phase differences of the components of said undesired signals present at the outputs of each of said mixers, means for heterodyning each of said cross correlator output signals with the intermediate frequency signal from each of said auxiliary channels to produce auxiliary channel outputs having components at the same frequencies as the intermediate frequencies of the signal components in the main channel and with any phase differences removed, and means coupling said auxiliary channel outputs to said combining circuit in order to substract the signal components having intermediate frequencies the same as those present in the main channel from the signals in said main channel.

6. In combination, a main signal transmission channel having a directional antenna capable of receiving desired and undesired signals and having an output terminal, a plurality of auxiliary signal transmission channels each coupled to an omni-directional antenna primarily to receive said undesired signals, a plurality of correlating means for comparing the portions of each of said undesired signals present in said main channel and each of the corresponding undesired signals in said auxiliary channels to determine their phase and amplitude relationship, means for heterodyning the outputs of each of said correlating means with the undesired signals in each auxiliary channel to provide compensating signals, means for subtracting the frequency components of said compensating signals having frequency counterparts in said main channel from the signals present in said main channel for minimizing the amount of said undesired signals at said output terminal.

7. In an intermediate frequency sidelobe canceller, a main signal transmission channel having an output terminal and an input terminal coupled to receive a desired signal and undesired signals, a plurality of auxiliary signal transmission channels having output terminals and input terminals coupled to receive predominantly said undesired signals, a plurality of cross correlation means each of which is coupled to the output terminal of said main channel and to a separate one of the output terminals of said auxiliary channels, said cross correlation means detecting the relative amplitudes and phases of said undesired signals in said main channel and said undesired signals in said auxiliary channels and providing control signals accordingly, a plurality of cross feed networks coupled to separate output terminals of the auxiliary channels to receive said undesired signals and to said cross correlation means to receive said control signals, said cross feed networks including means automatically responsive to said control signals to adjust the amplitude and phase of each of said undesired signals to provide correcting signals equal in amplitude and phase to each of the undesired signals appearing at the output terminal of said main channel, and means for substracting said correcting signals from said desired signal distorted by undesired signals to provide a pure signal.

8. In an intermediate frequency sidelobe canceller, a main signal transmission channel having an output terminal and an input terminal coupled to receive a signal distributed by noise from a plurality of sources, a plurality of auxiliary signal transmission channels having output terminals and input terminals coupled to receive predominantly said noise from a plurality of sources, a plurality of cross correlation means each of which is coupled to the output terminal of said main channel and to a separate one of the output terminals of said auxiliary channels, said cross correlation means detecting the relative amplitudes and phases of said noise in said main channel and said noise in said auxiliary channels and providing control signals accordingly, a plurality of cross feed networks coupled to separate output terminals of the auxiliary channels to receive said noise and to said cross correlation means to receive said control signals, said cross feed networks including means automatically responsive to said control signals to adjust the amplitude and phase of said noise in each auxiliary channel to provide correcting signals equal in amplitude and phase for subtracting said correcting signals from said desired signal distorted by noise to provide a pure signal.

* * * * *